Dec. 10, 1968   B. G. BJALME   3,414,961
TELESCOPING PIPE JOINT TOOL
Filed May 12, 1966   3 Sheets-Sheet 3
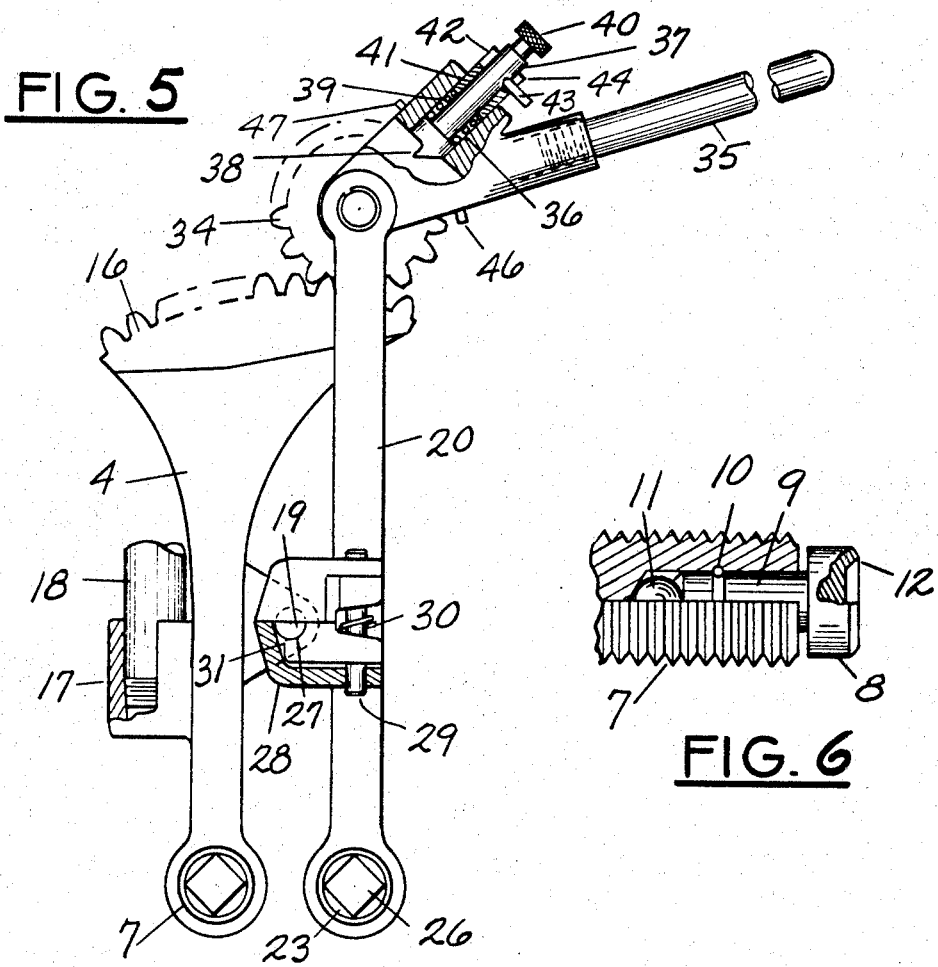
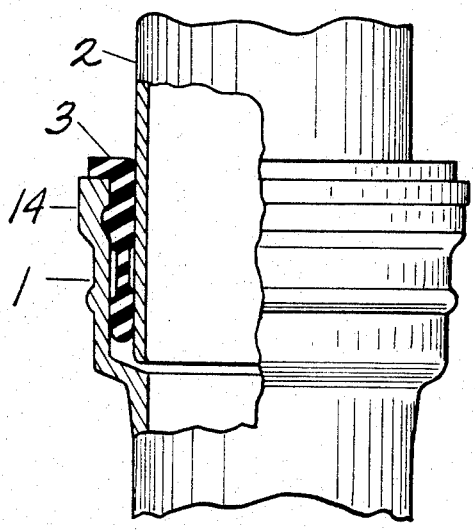
INVENTOR.
Bengt G. Bjalme
BY Ralph Hammar
Attorney

# United States Patent Office 3,414,961
Patented Dec. 10, 1968

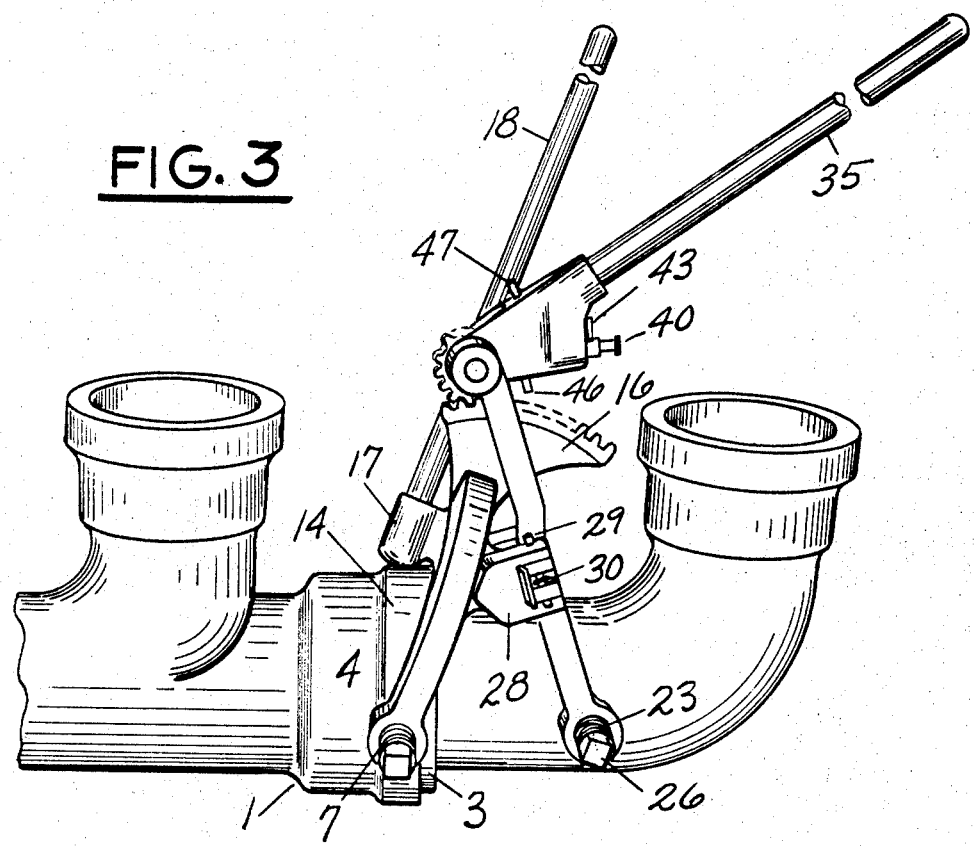
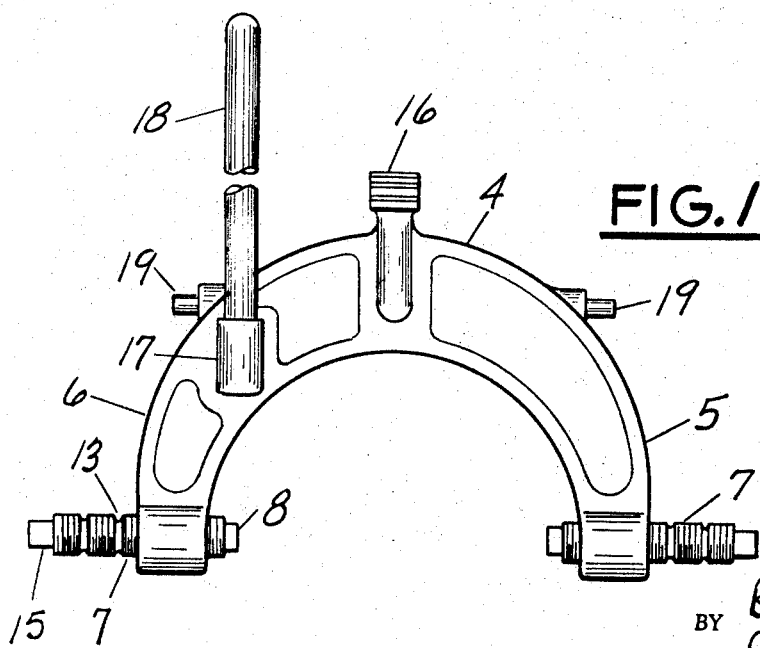

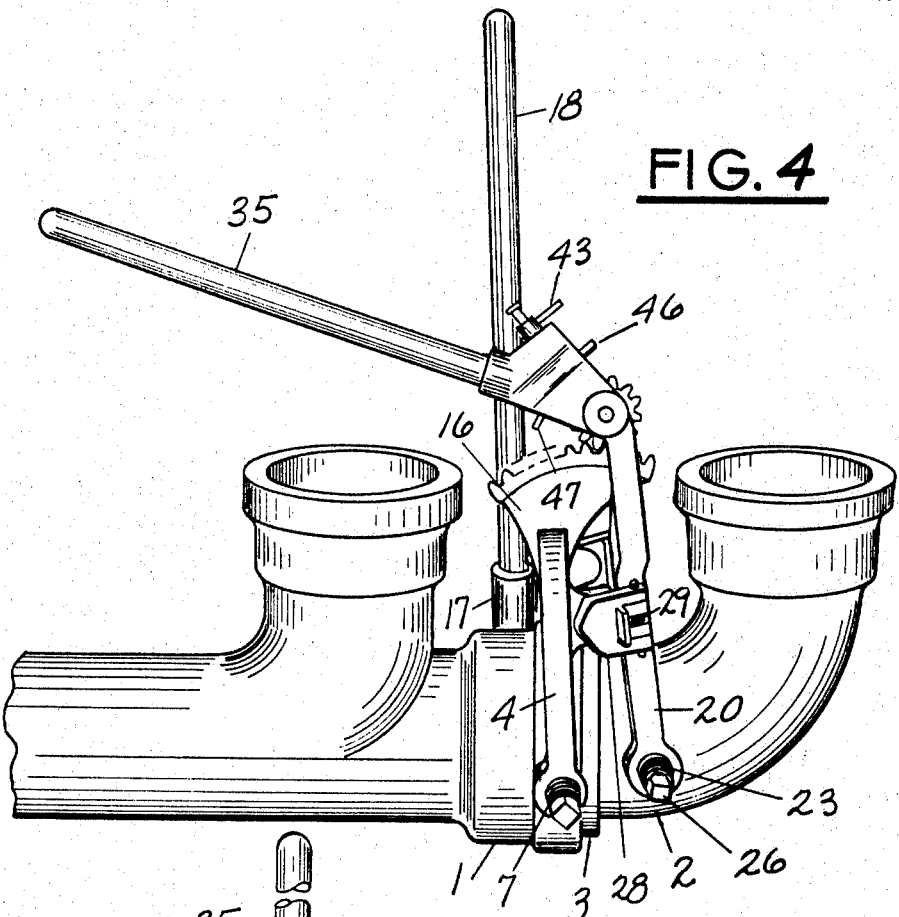
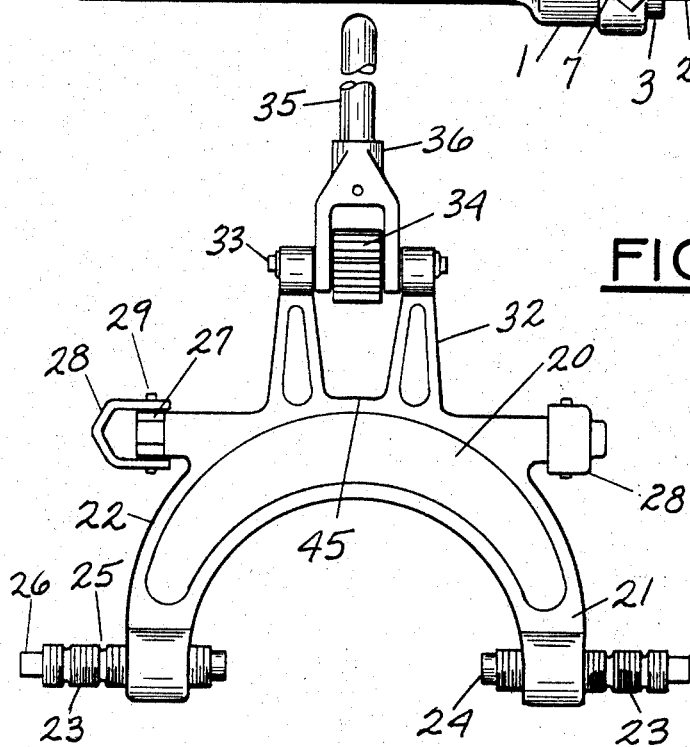

3,414,961
TELESCOPING PIPE JOINT TOOL
Bengt G. Bjalme, Erie, Pa., assignor to Reed Manufacturing Company, Erie, Pa., a corporation of Pennsylvania
Filed May 12, 1966, Ser. No. 549,583
10 Claims. (Cl. 29—237)

ABSTRACT OF THE DISCLOSURE

Coaxial telescoping joints sections are assembled or disassembled by lever members having each diametral jaws gripping one of the joint sections and hinged together on an axis radially spaced from and transverse to the longitudinal axis of the joint sections. One of the levers has a handle to steady and guide the assembly and disassembly. The other of the levers has a pinion turned by a handle through a ratchet connection meshing with a segmental gear on said one lever. The application of forces to the joint sections is inherently balanced and although each member undergoes a pivotal movement, the resultant movement of the joint sections is in a straight line. The ratchet connection facilitates turning of the pinion in cramped spaces.

---

This invention is a tool for assembling and disassembling pipe and fittings having joints of the type comprising two coaxial telescoping joint sections. A major use of the tool is for bell and spigot cast iron soil pipe having a rubber gasket in place of the lead and oakum seal. In a preferred form, the assembly or disassembly forces are applied through lever members each having diametral jaws gripping one of the joint sections and hinged together on an axis radially spaced from and transverse to the longitudinal axis of the joint sections.

In the drawing, FIG. 1 is an elevation of the part of the tool adapted to be mounted on the bell of a cast iron soil pipe or fitting, FIG. 2 is an elevation of the part of the tool adapted to be mounted on the spigot, FIG. 3 is a side elevation of the tool in position for assembling a bell and spigot joint, FIG. 4 is a side elevation of the tool in position for disassembling a bell and spigot joint, FIG. 5 is a side elevation of the tool partly in section, FIG. 6 is a section through one of the pipe gripping jaws, and FIG. 7 is a side elevation partly in section of a gasket sealed bell and spigot joint.

Referring first to FIG. 7, there is shown a joint comprising a bell 1, a spigot 2 and gasket 3. In assembly, the gasket is first inserted into the bell and after applying a lubricant to the gasket, the point sections are forced together. This general type of joint is widely used for cast iron soil pipe. Because of variations in the dimensions of the cast pipe, the forces required to assemble and disassemble the joint vary widely. Some joints require so little force that hand assembly is possible. Other joints require forces ranging up to 2,000 pounds. The assembly and disassembly is further complicated by the fact that in many cases the joints are between fittings where there is very little room.

FIG. 1 is a back view of the part of the tool adapted to be attached to the bell. It comprises a lever or yoke 4 having depending arms 5, 6 adapted to straddle the bell section of a pipe joint. Screwed into the end of the arms 5, 6 are diametrally opposed screws 7 each carrying at its inner end a pipe gripping jaw 8 shown in greater detail in FIG. 6. Each jaw has a stem 9 rotatably journaled in the screw 7 and held in place by a snap ring 10. The inner end of the stem bears on a ball thrust bearing 11. The jaw has an annular gripping surface 12 which provides a secure grip on the pipe without localized stress which could risk fracture. To facilitate installation, grooves 13 are cut in the screws to indicate the approximate positions of adjustment for the various sizes of pipe. The user sets each screw so the required groove 13 is substantially flush with the outer surface of the associated arm 5 or 6. The yoke is then slipped onto the bell with the jaws either opposite the bell 1 or the bead 14 on the bell and the screws 7 are then tightened finger tight. A half turn of one of the screws by a wrench applied to wrench surface 15 will ordinarily securely grip the bell section of the pipe between the jaws 8. After the jaws have been tightened onto the bell, the yoke 4 is free to pivot relative to the pipe because the jaws are journaled in the arms 5, 6.

At the center of the yoke 4 is an integral, segmental gear 16 which forms part of the force applying mechanism to be described. At the back of the yoke 4 is a socket 17 in which is fixed a handle 18. At opposite sides of the yoke are outwardly projecting hinge pins 19 on an axis radially spaced from and transverse to the longitudinal axis of the joint sections, such as the bell and spigot sections illustrated.

The other part of the joint tool, as shown in FIG. 2 comprises a lever or yoke 20 having depending arms 21, 22 adapted to straddle the spigot section 2 of a pipe joint. Screwed into the lower ends of the arms 21, 22 are diametrally opposed screws 23 corresponding to the screws 7 and rotatably carrying at their inner ends diametrally opposed pipe gripping jaws 24 of the same construction as the jaws 8. The screws 23 have grooves 25 (corresponding to grooves 13) indicating approximate adjustment for mounting the yoke 20 on the various sizes of the spigot joint sections. When mounting, the screws 23 are first adjusted to the appropriate position and then first tightened finger tight against the spigot section and then further tightened by a wrench applied to wrench surface 26 at the outer end of the screws.

Before mounting the yoke 20 on the spigot section of the pipe, it is necessary to consider whether the tool is to be used for assembly of a joint, as shown in FIG. 3, or for disassembly of a joint, as shown in FIG. 4. The function to be formed by the tool determines the position at which the jaws 24 should grip the spigot section of the joint. The jaws 8 and 24 should be close together if the tool is to be used for disassembly, as shown in FIG. 4, and should be far apart if the tool is to be used for assembly, as shown in FIG. 3.

The yoke 20 has integral semi-cylindrical hinge knuckle members 27 which fit over the hinge pins 19 on the yoke 4. Associated with each of the knuckle members 27 is a cap 28 pivoted on the yoke 20 by a pin 29 and urged by a coil spring 30 (FIG. 5) to a position covering the open ends 31 of the knuckle members 27. When the yokes 20 and 4 are to be connected, the caps 28 are easily swung to uncover the open ends 31 of the knuckle members 27 and after the knuckle members 27 are in place on the hinge pins 19, the caps 28 need merely be released and they will swing down into place and lock the knuckles to the hinge pins.

At the upper end of the yoke 20 are spaced arms 32 in which is journaled a shaft 33 to which is fixed a pinion 34 meshing with the segmental gear 16. Pivoted on the shaft 33 is a handle 35 having a socket 36 (FIG. 5) for a pawl 37, the inner end 38 of which cooperates with the teeth of the pinion 34. The pawl is urged by a coil spring 39 toward the pinion. At the upper end of the pawl is a hand grip portion 40 by which the pawl may be lifted clear of the pinion. The pawl is slidable in a collar 41 having a slot 42 receiving a pin 43. When the pin 43 is crosswise of the slot 42, it engages the upper end 44 of the collar 41 and holds the pawl clear of the pinion. When the pin 43 is in line with the slot 42, it enters the slot and permits engagement of the inner end 38 of the pawl with the teeth of the pinion. The pin 43 can serve as a pointer for the direction of movement of the joint gripping jaws 8 and 24. In the position shown in FIG. 5, the inner end 38 of the pawl slips over the teeth of the pinion 34 when the lever 35 is moved in a clockwise direction and grips one of the teeth of the pinion when the lever 35 is moved in a counterclockwise direction. Counterclockwise turning of the pinion 34 causes relative pivotal movement of the yokes 4 and 20 about the hinge pins 19 in the direction to move the pipe gripping jaws 8 and 24 apart as is required for separating the sections of the joint. When the pawl is turned 180° from the position illustrated, the lever 35 turns the pinion only in a clockwise direction as is required for joint assembly.

In the assembly and disassembly operations, one hand grips the lever 18 and the other the lever 35. Two handed operation is inherently balanced. The purpose of the lever 18 is to steady the tool and to guide the assembly and disassembly of the joint sections. While both yokes undergo a pivotal movement, the resultant movement of the joint sections is a straight line.

The parts of the tool are automatically positioned in the wide open position for the start of an assembly operation by engagement of the segmental gear 16 with stop surface 45 between the arms 32. When in this position, the jaws are far enough apart to assemble any joint. In the FIG. 3 or assembly position, a pin 46 on the handle 35 may be swung into mesh with the gear 16 to hold yokes 4 and 20 in position while the screws 23 are being tightened. The parts of the tool are positioned in the closed position desirable for disassembly of a joint by abutment of the lower ends of the arms 5, 6 and 21, 22. A similar pin 47 on the handle 35 may be swung into engagement with the gear 16 to hold the yokes 4 and 20 in the closed or disassembly position while the screws 23 are being tightened. It will be noted from FIGS. 3 and 5 that the pins 46, 47 can hold the yokes in intermediate positions, i.e. less than wide open or less than fully closed. When either pin 46 or 47 meshes with the gear 16, the assembled tool can be carried by the handle 18.

In the use of the tool, it is ordinarily desirable to separate the parts of the tool by releasing the hinge connection 19, 27, 28 and first to connect the yoke 4 to the bell section of the joint. Once the connection is made, the hinge connection to the yoke 20 is established and its jaws fastened to the other section of the joint either in the assembly position shown in FIG. 3 or the disassembly position shown in FIG. 4. Now by appropriately positioning the pawl 37, the desired operation is conveniently performed as described above.

In a commercial form of the tool for assembling 2, 3 and 4 inch cast iron soil pipe, the weight of the tool is approximately 20 pounds, and the leverage ratio is approximately 25:1 with a 20 inch handle. This means that a joint requiring 2,000 pounds force for assembly or disassembly requires only an 80 pound force on the levers 35 and 18.

What is claimed as new is:
1. A tool for assembling pipe and fittings having joints of the type comprising two coaxial telescoping joint sections, said tool having a first lever member transverse to the longitudinal axis of said joint sections and having adjustable means for gripping one of the joint sections, a second lever member transverse to the longitudinal axis of said joint sections and having adjustable means for gripping the other of the joint sections, means radially spaced from the longitudinal axis of the joint sections for hinging the first and second members to each other about an axis transverse to the axis of said joint sections, and thrust means connected at one end to one member and at the other end to the other member for pivoting said members relative to each other about said hinge means in the direction of said thrust to compel a corresponding relative axial movement of said joint sections.

2. The tool of claim 1 in which each member has a yoke with arms straddling the associated joint section and diametrally opposed jaws journaled on a diametral axis in the arms and movable radially into gripping engagement with the associated joint section.

3. The tool of claim 1 in which each member has a yoke with arms straddling the associated joint section, screws threaded in said arms having diametrally opposed ends presented toward the associated joint section, and a jaw journaled into the end of each screw and gripping the associated joint section.

4. A tool for assembling pipe and fittings having joints of the type comprising two coaxial telescoping joint sections, said tool having a first lever member transverse to the longitudinal axis of said joint sections and having means for gripping one of the joint sections, a second lever member transverse to the longitudinal axis of said joint sections and having means for gripping the other of the joint sections, means radially spaced from the longitudinal axis of the joint sections for hinging the first and second members to each other about an axis transverse to the longitudinal axis of said joint sections, and means comprising a segmental gear on one member and a mating pinion on the other member for applying a force to said members for pivoting said members relative to each other about said hinge means in the direction of said force to compel a corresponding relative axial movement of said joint sections.

5. The tool of claim 4 having ratchet means for rotating the pinion.

6. The tool of claim 1 in which the hinge means has separable hinge parts respectively on one and the other member for joining the hinge connection between the members whereby one member may be attached separately to its joint section and the separable hinge parts hereafter brought together to establish the hinge connection.

7. The tool of claim 4 in which said one member has a lever fixed thereto for holding it steady while the pinion is rotated.

8. The tool of claim 3 in which the jaws have an annular gripping surface presented edgewise to the associated joint section.

9. The tool of claim 5 in which the ratchet means has a handle with a projection movable into engagement with the segmental gear to hold the members in fixed relation to each other.

10. The tool of claim 1 in which the thrust means has two hand grip means respectively connected to one lever member and to the other lever member.

References Cited
UNITED STATES PATENTS

| | | | |
|---|---|---|---|
| 1,513,160 | 10/1924 | Dahlquist | 29—221 |
| 2,958,125 | 11/1960 | Nichols | 29—237 |
| 3,182,388 | 5/1965 | Hart et al. | 29—237 X |
| 3,270,406 | 9/1966 | Gorman et al. | 29—237 |
| 2,916,812 | 12/1959 | Milo | 29—237 |
| 3,096,572 | 7/1963 | Simmons | 29—237 |

ROBERT C. RIORDON, *Primary Examiner.*

J. C. PETERS, *Assistant Examiner.*